United States Patent [19]
von Cube et al.

[11] 3,817,321
[45] June 18, 1974

[54] COOLING APPARATUS SEMICONDUCTOR ELEMENTS, COMPRISING PARTITIONED BUBBLE PUMP, SEPARATOR AND CONDENSER MEANS

[75] Inventors: Hans-Ludwig von Cube, Wilhelmsfeld; Edmund Wagner, Wiesbaden, both of Germany

[73] Assignee: Robert Bosch GmbH, Stuttgart, Germany

[22] Filed: Jan. 14, 1972

[21] Appl. No.: 217,748

[30] Foreign Application Priority Data

Jan. 19, 1971 Germany............................ 2102254

[52] U.S. Cl................................. 165/105, 417/209
[51] Int. Cl............................................. F28d 1/06
[58] Field of Search...................... 165/105; 417/209

[56] References Cited

UNITED STATES PATENTS

| | | | |
|---|---|---|---|
| 2,110,774 | 1/1935 | Privett | 165/105 |
| 2,910,119 | 10/1959 | Wennerberg | 417/209 |
| 3,586,101 | 6/1971 | Chu et al. | 165/105 |
| 3,609,991 | 10/1969 | Chu et al. | 165/105 |

OTHER PUBLICATIONS

"Chemical Rubber Company," Handbook, 50th Edition, 1969, pages E-28, E-29, & E-31.

*Primary Examiner*—Samuel Scott
*Assistant Examiner*—Allan Russell Burke
*Attorney, Agent, or Firm*—Michael S. Striker

[57] ABSTRACT

Apparatus for the cooling of high power type semiconductor elements, especially thyristors in electrically powered vehicles, has one or more bubble pumps which are placed into direct heat-exchanging contact with a semiconductor element and are connected with the vessel of a liquid-collecting vapor separator containing a supply of liquid coolant which evaporates at temperatures developing when the semiconductor element is under load and heats the pump or pumps. The separator is connected with an air-cooled condenser, and the condensate is returned to the pump or pumps, either by way of the vessel or by way of an injector which also receives liquid coolant from the separator. Each bubble pump has a current-conducting housing whose chamber is subdivided into several passages having a cross-sectional area which increases in a direction from the liquid-admitting inlet toward the vapor-discharging outlet of the pump.

18 Claims, 8 Drawing Figures

COOLING APPARATUS SEMICONDUCTOR ELEMENTS, COMPRISING PARTITIONED BUBBLE PUMP, SEPARATOR AND CONDENSER MEANS

BACKGROUND OF THE INVENTION

The present invention relates to cooling apparatus in general, and more particularly to improvements in apparatus which can be utilized to cool high power type semiconductor elements, such as thyristors. Still more particularly, the invention relates to improvements in cooling apparatus of the type wherein one or more evaporators are preferably in direct heat-exchanging contact with the element or elements to be cooled and serve to allow for circulation of a heat carrier in the form of a liquid which evaporates at the temperatures developing when the element or elements to be cooled are in use. The carrier is preferably a non-conductive liquid.

German Utility Model No. 1,766,192 discloses a cooling apparatus wherein the evaporator forms the lower part of a container the upper part of which constitutes a condenser. A drawback of such apparatus is that the transfer of heat from the semi-conductor element to the liquid coolant in the evaporator is limited because, when the semiconductor element is under a high load, there develops a film of evaporated material which greatly reduces the transfer of heat from the semiconductor element. Another drawback of such cooling apparatus is that the entire container must be mounted in the circuit which includes the semiconductor element; the container normally occupies a substantial amount of space so that it cannot be readily installed in all types of circuits wherein one or more high power type semiconductor elements require cooling.

SUMMARY OF THE INVENTION

An object of the invention is to provide a novel and improved cooling apparatus for high power type semiconductors or analogous heat-generating elements wherein the component or components which must be placed close to or in actual contact with the element to be cooled occupy less room than in presently known cooling apparatus.

Another object of the invention is to provide a novel and improved evaporator for use in cooling apparatus for semiconductor elements or the like.

A further object of the invention is to provide an apparatus whose cooling action is more intensive than the cooling action of heretofore used apparatus for cooling of semiconductor elements.

An additional object of the invention is to provide a cooling apparatus which is particularly suited for the cooling of thyristors or analogous semiconductor elements in electrically powered vehicles.

The invention resides in the provision of an apparatus for cooling high power type semiconductors or analogous heat generating elements which comprises liquid-collecting vapor separator means including a vessel containing a supply of evaporable liquid coolant, evaporator means comprising at least one bubble pump which is spaced from the separator means and can be placed into a position of heat-exchange with or made integral with the element or elements to be cooled, a first pipe connecting a liquid-discharging outlet of the vessel with an inlet of the pump so that the liquid coolant which enters the pump evaporates at least in part in response to exchange of heat with the element or elements and is returned to an inlet of the vessel by way of a second pipe, and condenser means having an inlet connected with a vapor-discharging outlet of the vessel and an outlet by way of which the condensate is returned to the inlet of the pump, either through the intermediary of the vessel or by way of a liquid injector which is preferably also connected with the liquid-discharging outlet of the vessel. The liquid coolant is preferably non-conductive and each of the aforementioned pipes preferably comprises an insulating portion to prevent the flow of current between the pump and the separator vessel.

The novel features which are considered as characteristic of the invention are set forth in particular in the appended claims. The improved cooling apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
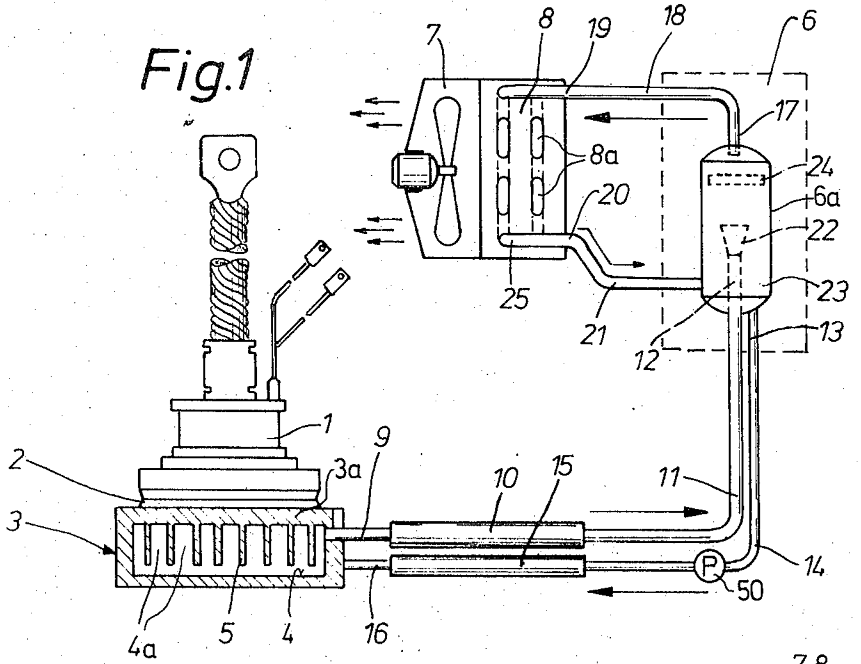
FIG. 1 is a diagrammatic partly elevational and partly vertical sectional view of an apparatus which is utilized to cool a thyristor in an electrically powered vehicle.
Figure 3:
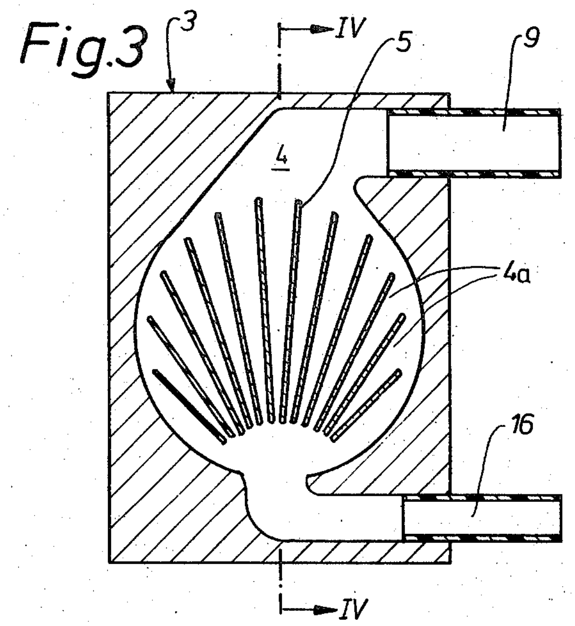
FIG. 3 is an enlarged horizontal sectional view of a bubble pump in the cooling apparatus of FIG. 1.
Figure 4:
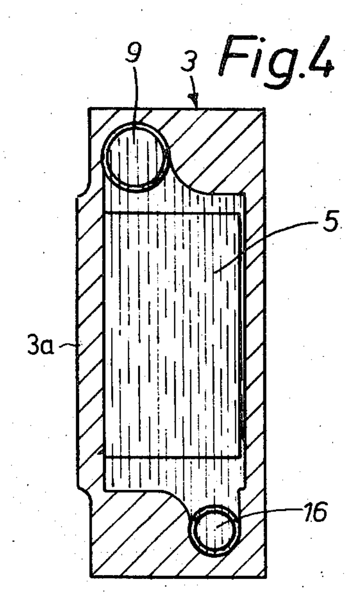
FIG. 4 is a sectional view as seen in the direction of arrows from the line IV—IV of FIG. 3.

FIG. 1 illustrates an apparatus including a cooling circuit which is utilized to cool a high power type semiconductor element in the form of a thyristor 1. The flat bottom wall 2 of the thyristor 1 is in full surface-to-surface contact or integral with the top wall 3*a* of the housing of an evaporator 3 so as to insure satisfactory flow of electric current and satisfactory transfer of heat. The evaporator 3 constitutes the cooling element of the circuit and is shown in the form of a so-called bubble pump the details of which are illustrated in FIGS. 3 and 4. The chamber 4 of the bubble pump 3 is subdivided into a series of passages or compartments 4*a* by a set of partitions in the form of ribs 5 which extend downwardly from and are integral with the top wall 3*a*. Such arrangement enhances the exchange of heat between the thyristor 1 and a fluid coolant which is circulated through the chamber 4. The cooling fluid is a non-conductive liquid which evaporates at the temperatures which develop when the thyristor 1 is in use.

The cooling circuit further comprises a liquid-collecting vapor separator 6 (indicated by broken lines) which comprises an upright vessel 6*a* having in its bottom wall an upwardly extending inlet 12 for admission of a mixture of liquid and vapors, a liquid-discharging outlet 13, and a vapor-discharging outlet 17. The inlet 12 extends into the interior of the vessel 6*a* and terminates in an upwardly diverging funnel 22 which may be located above the normal liquid level. The bubble pump 3 comprises an outlet 9 for discharge of a mixture of liquid and vapors and an inlet 16 (located at a level below the outlet 9) for admission of liquid coolant. The outlet 9 is connected with the inlet 12 by a pipe 11 a portion of which is preferably flexible (as at 10) and consists of insulating material, e.g., a rubber hose. A second pipe 14, including a flexible portion or hose 15 of insulating material, connects the outlet 13 with the inlet 16. It will be noted that the vessel 6*a* is located at a level above the evaporator 3 and that the latter is bodily spaced from the separator 6. A condenser 8 contains a coil 8a wherein the vapors are cooled by streams of air induced by a blower 7. The inlet 19 of the coil 8*a* is connected with the outlet 17 of the vessel 6*a* by a pipe 18, and a further pipe 21 connects the lower portion of the vessel 6*a* with the outlet 20 of the coil 8*a*. The reference character 25 denotes the condensate which is obtained in the coil 8*a* in response to cooling of vapors by the air streams. A plate-like liquid intercepting device 24 is mounted in the vessel 6*a* between the open upper end of the funnel 22 and the outlet 17 to prevent entry of liquid coolant into the pipe 18. The reference character 23 denotes a supply of liquid coolant in the lower part of the vessel 6*a*.

The operation:

When the thyristor 1 is in use, a portion of the liquid in the chamber 4 evaporates and the mixture of liquid and vapors flows automatically through the outlet 9, hose 10, pipe 11, inlet 12 and funnel 22 to enter the vessel 6*a*. The liquid which enters the vessel 6*a* by way of the inlet 12 is separated from vapors and flows into the lower part of the vessel, as at 23. The funnel 22 constitutes a diffusor which insures that a portion of the high flow energy of inflowing vapors is converted back into pressure which acts upon the surface of liquid 23 in the vessel 6*a*. This causes the liquid to leave the vessel 6*a* by way of the outlet 13 and to flow through the pipe 14, hose 15 and inlet 16 into the chamber 4 of the evaporator 3 into renewed exchange of heat with the top wall 3*a* and its partitions or ribs 5. The circulation of liquid 23 is further enhanced by the relatively small static pressure which develops due to the fact that the vessel 6*a* is located at a level above the evaporator 3.

The vapors which are separated from liquid coolant in the vessel 6*a* enter the outlet 17 and pass through the pipe 18 to enter the coil 8*a* of the condenser 8 by way of the inlet 19. The aforementioned intercepting device 24 prevents the vapors from entraining appreciable amounts of liquid into the pipe 18. The condensate 25 which develops in the coil 8*a* as a result of the cooling action of air stream induced by the blower 7 flows back into the lower portion of the vessel 6*a* by way of the outlet 20 and pipe 21. Such condensate 25 then forms part of the supply of liquid 23 and is recirculated through the evaporator 3. The level of the outlet 20 is preferably selected in such a way that the condensate 25 flows into the vessel 6*a* as a result of slight static pressure. It will be noted that the apparatus of FIG. 1 can recirculate non-evaporated liquid coolant (between the pump 3 and vessel 6*a*) as well as the evaporated coolant (by way of the vessel 6*a* and coil 8*a*). The circulating coolant insures that the mass density of the liquid stream at the ribs 5 is very high which in turn insures a higher heat flux density and a higher heat transfer coefficient.

Figure 2:
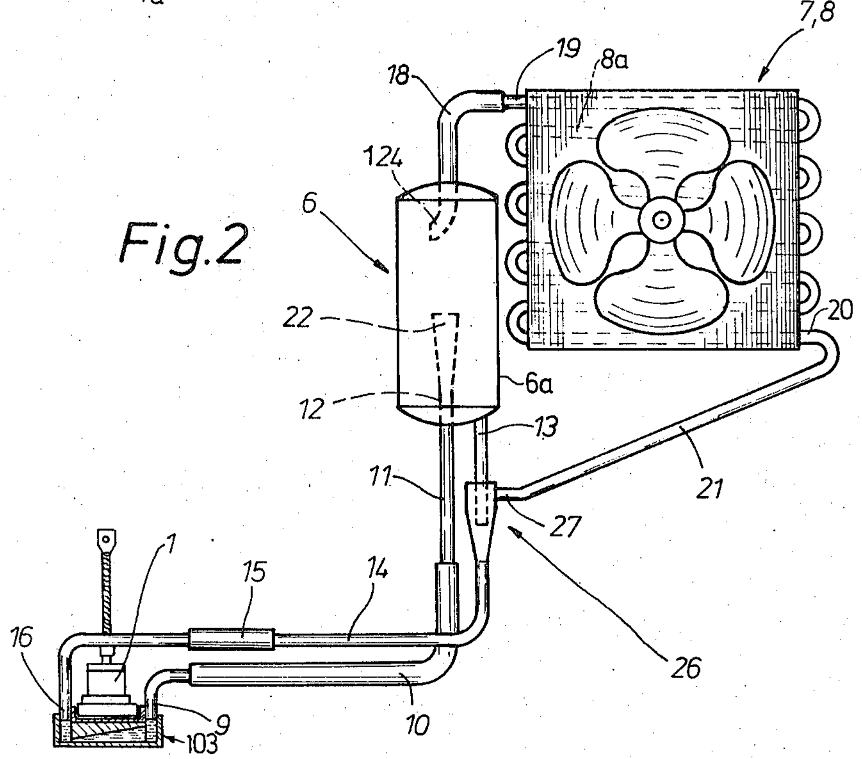
FIG. 2 is a similar partly elevational and partly vertical sectional view of a second cooling apparatus.
Figure 5:
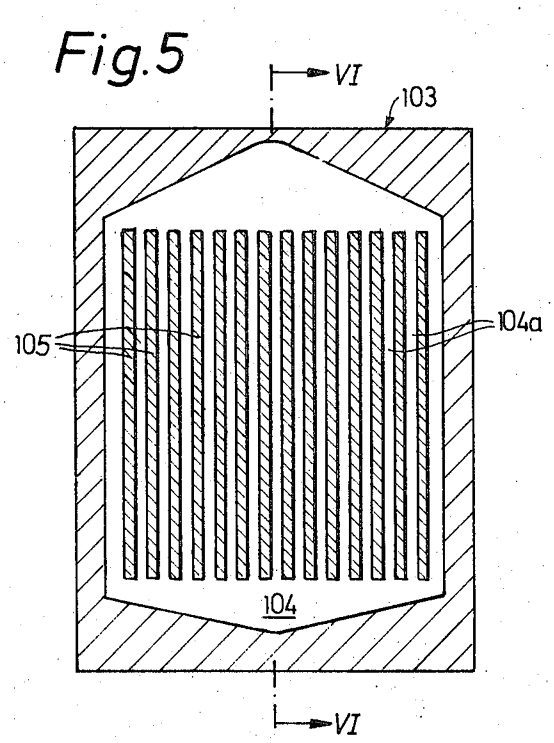
FIG. 5 is an enlarged horizontal sectional view of a bubble pump forming part of the evaporator in the cooling apparatus of FIG. 2.
Figure 6:
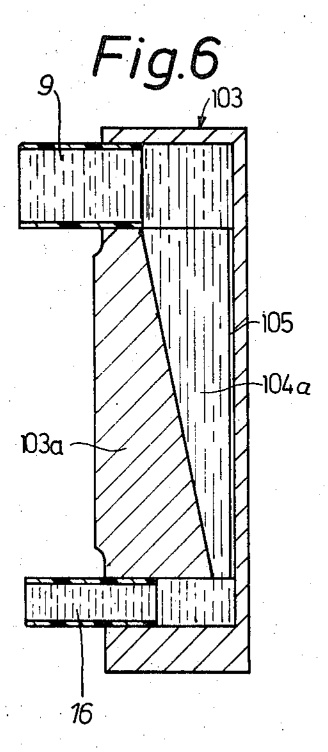
FIG. 6 is a sectional view as seen in the direction of arrows from the line VI—VI of FIG. 5.

FIG. 2 illustrates a second cooling apparatus which comprises an injector 26 serving to promote the flow of liquid coolant to the inlet 16 of a modified bubble pump 103. The injector 26 is connected with the outlet 13 of the vessel 6a of the liquid-collecting vapor separator 6, with the pipe 21 which delivers thereto condensate from the coil 8*a*, and with the pipe 14 which delivers liquid coolant to the inlet 16. The part denoted by the reference character 27 is the discharge end of the pipe 21. The injector 26 is illustrated in detail in FIG. 8, and the details of the bubble pump 103 are shown in FIGS. 5 and 6. An advantage of the injector 26 is that it overcomes the suction which develops in the coil 8*a* as a result of condensation of vapors and thus insures more satisfactory flow of fluid through the condenser 8. The vapor-discharging outlet of the vessel 6*a* in the apparatus of FIG. 2 is bent to one side (see particularly FIG. 8) to form an elbow with a lateral intake opening and to thus constitute a liquid intercepting device 124 replacing the plate-like intercepting device 24 of FIG. 1. Otherwise, the operation of the apparatus of FIG. 2 is analogous to that of the apparatus shown in FIG. 1.

FIGS. 3 and 4 illustrate the details of the bubble pump 3. It will be seen that the cooling partitions or ribs 5 diverge in a direction from the inlet 16 toward the outlet 9 so that the cross-sectional areas of the compartments or passages 4*a* increase gradually in the same direction. Thus, the width of the passages 4*a* increases in the direction in which the vaporization of inflowing liquid coolant progresses with attendant increase in volume. Such configuration of the passages 4*a* insures that the vapors are compelled to flow in the desired direction, namely, toward and into the outlet 9 and thence into the vessel 6*a* of FIG. 1.

The housing of the bubble pump 103 of FIGS. 5 and 6 also comprises a top wall 103*a* which can be placed into surface-to-surface abutment or made integral with a wall of the thyristor 1 (see FIG. 2) and a plurality of partitions or ribs 105 which are integral with the wall 103*a* and subdivide the chamber 104 of the pump 103 into a plurality of passages or compartments 104*a*. The ribs 105 are disposed in parallel planes so that the width of each passage 104*a* is constant from end to end. However, the height of these passages varies gradually in a direction from the inlet 16 toward the outlet 9 (see FIG. 6) to thus again insure that the volumes and cross-sectional areas of passages 104*a* increase in the same direction; this guarantees that the vapors which develop in response to exchange of heat between the liquid coolant and the thyristor 1 are compelled to flow toward and to enter the outlet 9. Each of the ribs 105 resembles a flat wedge whose height increases in a direction from the inlet 16 toward the outlet 9.

Figures 7, 8:
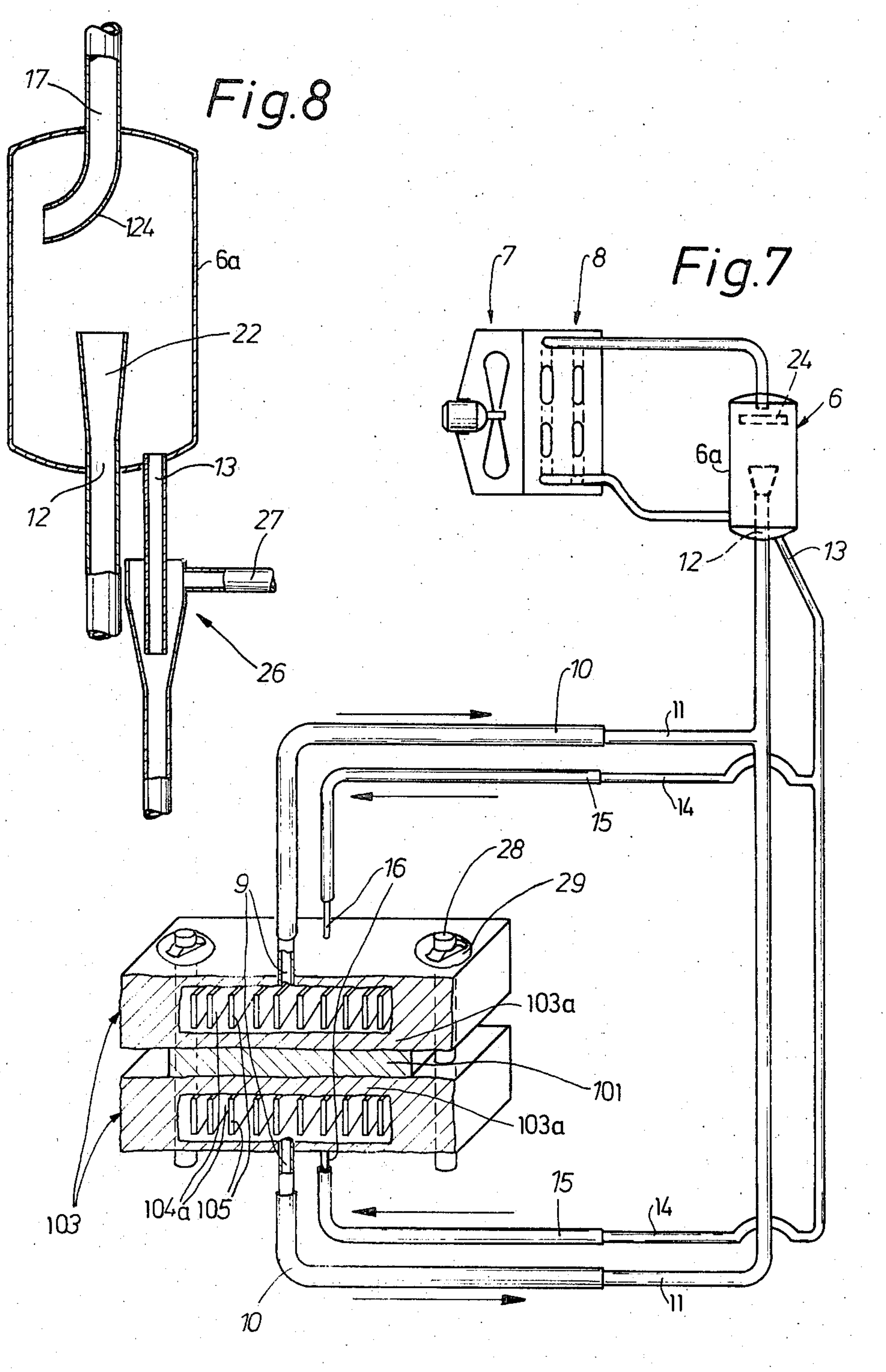
FIG. 7 is a schematic partly elevational and partly vertical sectional view of a third cooling apparatus wherein the evaporator comprises two bubble pumps of the type shown in FIGS. 4 and 5, the bubble pumps and the semiconductor element therebetween being shown in a perspective view.
FIG. 8 is an enlarged vertical sectional view of a liquid injector which is utilized in the cooling apparatus of FIG. 2.

Referring finally to FIG. 7, there is shown a cooling apparatus with an evaporator comprising a pair of bubble pumps 103 which flank a plate- or disk-shaped high power type semiconductor element 101, e.g., a thyristor. The housings of the bubble pumps 103 further serve as conductor means for supplying electric current to the thyristor 101. It is clear that at least one of the bubble pumps 103 of FIG. 7 can be replaced with a bubble pump 3.

The cooling apparatus of FIG. 7 further comprises a single blower 7, a single condenser 8 and single liquid-collecting vapor separator 6 having a vessel 6*a* which receives vapors from the outlets 9 of both bubble pumps 103 and delivers cooling liquid to both inlets 16. It will be noted that the pairs of pipes 11 and 14 are respectively connected in parallel and respectively communicate with a single inlet 12 and a single liquid-discharging outlet 13 of the vessel 6*a*. Each of these pipes contains an insulating hose 10 or 15. In order to enhance the mechanical stability of the electrode system of FIG. 7, the two bubble pumps 103 are separably connected to each other by insulating fasteners here shown as comprising bolts 28 and dished springs 29.

In certain instances, it will be necessary to simultaneously cool two or more semiconductor elements. Such cooling can be effected by apparatus employing one or more bubble pumps for each semiconductor element. As a rule, it will suffice to connect all of the bubble pumps with a single liquid-collecting vapor separator. In contrast to the construction shown in FIG. 7, each pipe 11 can be connected with a discrete inlet 12 and each pipe 14 can be connected with a discrete outlet 13 of the vessel 6*a* or an analogous vessel. It is further within the purview of the invention to make the bubble pump or pumps 3 or 103 integral with the corresponding semiconductor elements to enhance the mechanical stability of the construction and to further increase the heat transfer coefficient between the semiconductor element and the liquid coolant. With reference to FIG. 1 or 2, the wall 2 of the semiconductor element 1 can be made integral with the wall 3*a* or 103*a* of the bubble pump 3 or 103; in FIG. 7, the semiconductor element 101 can be made integral with the wall or walls 103*a* of one or both bubble pumps 103.

If the bubble pump or pumps are called upon to lead away very substantial amounts of heat, the heat exchange between the semiconductor element and the adjacent wall or walls of one or more bubble pump housings can be enhanced by increasing the rate of circulation of coolant. This can be achieved in a very simple way by installing in the conduit 14 a suitable auxiliary pump 50 (see FIG. 1). Similar auxiliary pumps can be used in the embodiments of FIGS. 2 and 7.

The improved cooling apparatus has been found to be particularly suited for use in connection with semiconductor elements (especially thyristors) in electrically powered conveyances. The liquid coolant which can be used in the apparatus of the present invention can be selected from a wide variety of liquids with a sufficiently low boiling point. At the present time, we prefer to utilize one of the four liquid coolants known as R 113, R 11, R 21 and R 114 whose compositions are respectively as follows: $C_2F_3CL_3$, $CFCl_3$, $CHFCl_2$ and $C_2F_4Cl_2$.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In an apparatus for cooling semiconductors or analogous heat-generating elements, a cooling circuit containing a supply of evaporable non-conductive liquid coolant and comprising cooling means positioned to exchange heat with at least one heat-generating element and including at least one bubble pump having a chamber, inlet means for admission into said chamber of liquid coolant at least a portion of which evaporates as a result of exchange of heat between said cooling means and a heat-generating element, and vapor-discharging outlet means; condenser means spaced apart from said bubble pump and having vapor-admitting inlet means and condensate-discharging outlet means; pipe means respectively connecting the inlet means and outlet means of said bubble pump with the outlet means and inlet means of said condenser means; liquid-collecting vapor separator means including a vessel spaced apart from said bubble pump and installed in said pipe means, said vessel having vapor-admitting inlet means communicating with the outlet means of said bubble pump, vapor-discharging first outlet means communicating with the inlet means of said condenser means, and liquid-discharging second outlet means communicating with the inlet means of said bubble pump, said pipe means including a first pipe connecting the second outlet means of said vessel with the inlet means of said bubble pump; and injector means installed in said first pipe, said pipe means further comprising a second pipe connecting the outlet means of said condenser means with said injector means so that the inlet means of said bubble pump receives liquid coolant from said vessel and from said condenser means by way of said injector means.

2. In an apparatus for cooling semiconductors or analogous heat-generating elements, a cooling circuit containing a supply of evaporable non-conductive liquid coolant and comprising cooling means positioned to exchange heat with at least one heat-generating element and including at least one bubble pump having a chamber, inlet means for admission into said chamber of liquid coolant at least a portion of which evaporates as a result of exchange of heat between said cooling means and a heat-generating element, and vapor-discharging outlet means; condenser means spaced apart from said bubble pump and having vapor-admitting inlet means and condensate-discharging outlet means; pipe means respectively connecting the inlet means and outlet means of said bubble pump with the outlet means and inlet means of said condenser means; and liquid-collecting vapor separator means including a vessel spaced apart from said bubble pump and installed in said pipe means, said vessel having vapor-admitting inlet means communicating with the outlet means of said bubble pump, vapor-discharging first outlet means communicating with the inlet means of said condenser means, and liquid-discharging second outlet means communicating with the inlet means of said bubble pump, the inlet means of said vessel extending upwardly into said vessel and having an upper end portion constituting a diffusor for vapors.

3. In an apparatus for cooling semiconductors or analogous heat-generating elements, a cooling circuit containing a supply of evaporable non-conductive liquid coolant and comprising cooling means positioned to exchange heat with at least one heat-generating element and including at least one bubble pump having a housing defining a chamber, inlet means for admission into said chamber of liquid coolant at least a portion of which evaporates as a result of exchange of heat between said cooling means and a heat-generating element, and vapor-discharging outlet means, said housing including a plurality of partitions disposed in and subdividing said chamber into a plurality of passages whose cross-sectional area increases in a direction from said inlet means toward said outlet means; condenser means spaced apart from said bubble pump and having vapor-admitting inlet means and condensate-discharging outlet means; and pipe means respectively connecting the inlet means and outlet means of said bubble pump with the outlet means and inlet means of said condenser means.

4. A cooling circuit as defined in claim 3, further comprising liquid-collecting vapor separator means including a vessel spaced apart from said bubble pump and installed in said pipe means, said vessel having vapor-admitting inlet means communicating with the outlet means of said bubble pump, vapor-discharging first outlet means communicating with the inlet means of said condenser means, and liquid-discharging second outlet means communicating with the inlet means of said bubble pump.

5. A cooling circuit as defined in claim 4, wherein said pipe means includes a pipe connecting the second outlet means of said vessel with the inlet means of said bubble pump, and further comprising auxiliary pump means installed in said pipe to promote the flow of liquid coolant into said chamber.

6. A cooling circuit as defined in claim 4, wherein said vessel includes an upper portion and a lower portion containing at least a portion of said supply of liquid coolant, said pipe means including a first pipe connecting the outlet means of said condenser means with the lower portion of said vessel and a second pipe directly connecting the second outlet means of said vessel with the inlet means of said bubble pump, said second outlet means receiving liquid coolant from the lower portion of said vessel.

7. A cooling circuit as defined in claim 3, wherein said bubble pump is in direct heat-exchanging contact with at least one heat-generating element.

8. A cooling circuit as defined in claim 3 for cooling of substantially plate-like heat-generating elements, wherein said cooling means comprises two bubble pumps flanking a plate-like heat-generating element.

9. A cooling circuit as defined in claim 8, further comprising liquid-collecting vapor separator means including a single vessel spaced apart from said bubble pumps and installed in said pipe means, said vessel having single inlet means, first outlet means communicating with the inlet means of said condenser means and single second outlet means, said pipe means including first pipes connecting said single second outlet means with the inlet means of said bubble pumps and second pipes connecting said single inlet means with the outlet means of said bubble pumps.

10. A cooling circuit as defined in claim 9, wherein each of said first and second pipes comprises a portion consisting of insulating material.

11. A cooling circuit as defined in claim 8, further comprising liquid-collecting vapor separator means including a single vessel spaced apart from said bubble pumps and installed in said pipe means, said vessel having a pair of inlets, a first outlet communicating with the inlet means of said condenser means and a pair of second outlets, said pipe means comprising a pair of first pipes each connecting the outlet means of a different one of said bubble pumps with a different one of said pair of inlets and a pair of second pipes each connecting the inlet means of a different one of said bubble pumps with a different one of said pair of outlets.

12. A cooling circuit as defined in claim 3, wherein said bubble pump forms an integral part of a heat-generating element.

13. A cooling circuit as defined in claim 3, wherein said cooling means, said condenser means and said pipe means are built into an electrically powered conveyance which utilizes a heat-generating element cooled by said cooling means.

14. A cooling circuit as defined in claim 3, wherein said liquid coolant is selected from the group consisting of $CFCl_3$, $CHFCl_2$, $C_2F_3Cl_3$ and $C_2F_4Cl_2$.

15. A bubble pump, particularly for cooling of semiconductors or analogous heat-generating elements, comprising a housing defining an evaporation chamber and including an inlet for admission of an evaporable liquid coolant at least a portion of which evaporates in said chamber in response to heating of said housing, and an outlet for evacuation of vapors from said chamber; and partition means provided in said housing and subdividing said chamber into a plurality of passages whose cross-sectional area increases in a direction from said inlet toward said outlet.

16. A bubble pump as defined in claim 15, wherein said housing consists of current-conducting material.

17. A bubble pump as defined in claim 15, wherein said partition means includes a plurality of parallel partitions, each of said passages having a constant width and a height which increases in a direction from said inlet toward said outlet.

18. A bubble pump as defined in claim 15, wherein said partition means includes a plurality of partitions disposed in mutually inclined planes.

* * * * *